United States Patent
Hughes

(10) Patent No.: US 6,262,806 B1
(45) Date of Patent: *Jul. 17, 2001

(54) PAGE DESCRIPTION LANGUAGE CONVERSION USING SIDELINING

(75) Inventor: Macduff R. Hughes, Oakland, CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,080

(22) Filed: Dec. 19, 1997

(51) Int. Cl.$^7$ .................................................. G06F 15/00
(52) U.S. Cl. ..................... 358/1.15; 358/1.14; 358/1.16
(58) Field of Search ...................... 395/200.04, 200.08, 395/200.15, 114, 112, 116, 117, 101, 113, 107, 171; 358/1.15, 1.9, 1.17, 1.18, 1.13, 1.14, 1.16

(56) References Cited

U.S. PATENT DOCUMENTS 5,634,091 * 5/1997 Sands et al. ...................... 395/117
5,781,714 * 7/1998 Collins et al. ...................... 395/171
5,881,212 * 3/1999 Morita ................................ 395/112

OTHER PUBLICATIONS

PostScript Language Reference Manual, second ed., *Addison–Wesley Publishing Company*, 1990. (Table of Contents Only).

Portable Document Format Reference Manual, version 1.2, *Adobe Systems Incorporated*, 1996. (Table of Contents Only).

* cited by examiner

*Primary Examiner*—Joseph Mancuso
*Assistant Examiner*—Douglas Tran
(74) *Attorney, Agent, or Firm*—Fish & Richardson P.C.

(57) ABSTRACT

A method and apparatus to convert a document stored in a page sequential representation to a document stored in a page independent representation is described. The method includes receiving the page sequential representation of the document, storing instructions associated with the page sequential representation in an output file in a format determined by the page independent representation, storing a resource associated with the page sequential representation in an external resource file in a format determined by the page sequential representation, and storing in the output file a reference to the external resource file.

29 Claims, 4 Drawing Sheets

PAGE DESCRIPTION LANGUAGE CONVERSION USING SIDELINING

BACKGROUND

The invention relates to converting one page description representation of a document into another page description representation. More specifically, a method and device to convert a page sequential representation into a page independent representation is described.

Digitally stored documents are often represented in an output-device independent language known as a page description language (PDL). Well known PDLs include the POSTSCRIPT language and the PORTABLE DOCUMENT FORMAT (PDF) language. Both POSTSCRIPT and POR-TABLE DOCUMENT FORMAT are trademarks of Adobe Systems Incorporated, San Jose, Calif. In a PDL representation, a document may be described as lists of instructions and resources. Instructions, for example, include commands to draw a line between two points or to fill a region with a specified color. Resources, for example, include images (raster representations of displayable objects), color spaces, and font specifications.

Page sequential PDL representations are characterized by the fact that a resource used on page N may have been specified/defined on a prior page. In these situations, only a reference to the earlier specification is made on page N. This characteristic makes the document representation relatively compact because resources are not duplicated at every point in the file they are used. It also means that, in general, page N cannot be output (e.g., printed or displayed on a display screen) without first processing all (N–1) prior pages. POST-SCRIPT is a page sequential representation.

In a page independent PDL representation, every page that uses a resource has sufficient information to locate the resource in the file without processing preceding pages of the file. This allows any page in a document represented in a page independent PDL to be printed independently of any other page in the document. PDF is a page independent representation. It is the page independent characteristic of the PDF representation that is exploited in high-speed print environments.

SUMMARY

Generally, the invention provides apparatus and methods to convert a page sequential representation of a document to a page independent representation using sidelining. Sidelining is the process of storing an object, represented in the page sequential representation, in an external file, represented in the page independent representation, while continuing to process the page sequential file. The use of sideling can speed output generation and conserve memory usage when converting a page sequential representation of a document to a page independent representation.

DETAILED DESCRIPTION

Figure 1:
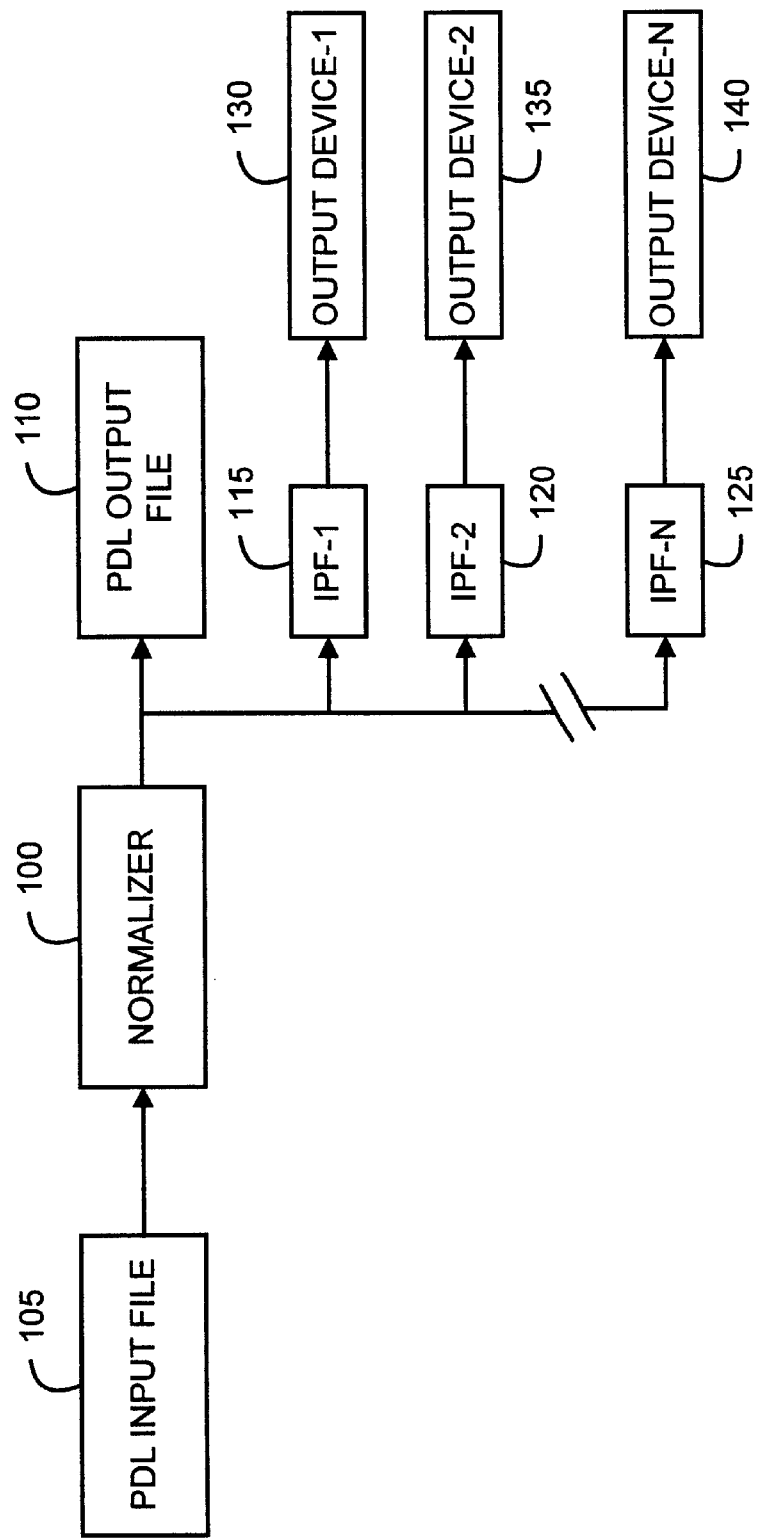
FIG. 1 is a schematic block diagram of a printing system.

In the illustrative print system shown in FIG. 1, a normalizer 100 is used to convert a page sequential PDL input file 105 (e.g., a POSTSCRIPT language file) into a page independent PDL output file 110 (e.g., PDF). For speed printing, the normalizer 100 can create individual page files, IPFs (115, 120, and 125) as each page of the input file 105 is converted. The IPFs can be sent to one or more output devices (130, 135, and 140), such as high speed roll-fed presses, which generate the desired output. In this manner, a first portion of the input file 105 can be printing while a later portion of the input file is still being converted. Once an IPF file has been processed by its associated output device, it may be discarded. The PDL output file 110 can be used to generate output at a later time in a page independent manner.

Figure 2:
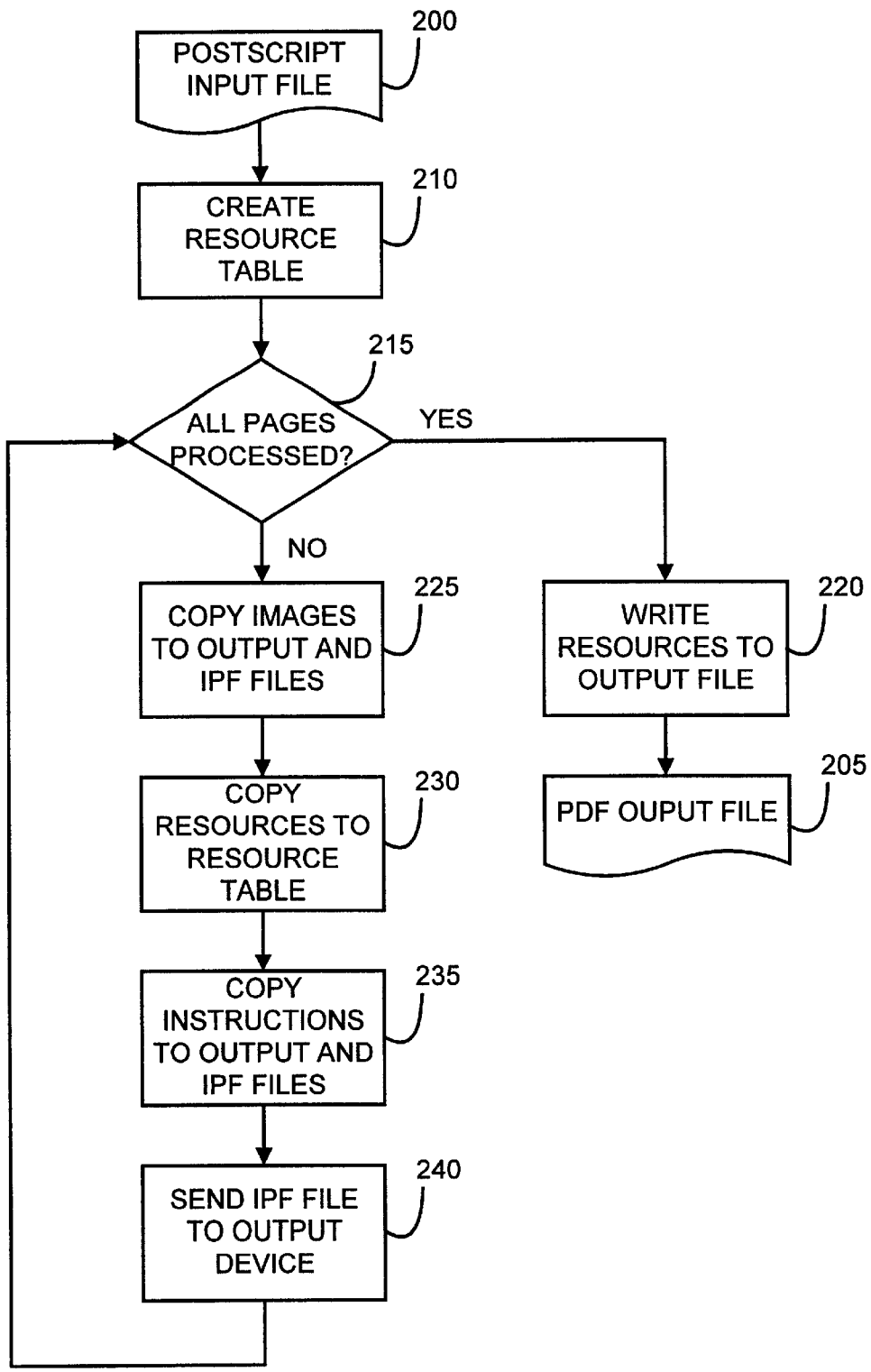
FIG. 2 is a flow-chart showing a POSTSCRIPT to POR-TABLE DOCUMENT FORMAT conversion process.

FIG. 2 illustrates a process useful in a normalizer to convert a page sequential POSTSCRIPT input file 200 to a page independent PDF output file 205. As a first step, the normalizer creates a resource table (step 210) which is used to store each resource encountered in the input file 200. The resource table allows the normalizer to substitute copies of a resource into an IPF and the output file 205 (at step 220) when the input file 200 only references a previously specified/defined resource. Next, a check is made to determine if all pages in the input file 200 have been processed (step 215). If all pages in the input file 200 have been processed (the 'yes' prong of step 215), the resources identified in the resource table are written to the output file (step 220). If all pages in the input file 200 have not been processed (the 'no' prong of step 215), the images of the current page are copied to the output file 205 and an IPF associated with the current input page (step 225). Input file resources are copied into the resource table at step 230. Next, page description instructions are written to the output file 205 and the currently active IPF file (step 235). When the input file's current page has been processed, the current IPF file is complete and may be sent immediately to an output device (step 240). Steps 225 through 240 are repeated for each page in the POSTSCRIPT input file 200.

When the POSTSCRIPT input file 200 contains a large resource (e.g., font specification) or image, the time spent copying the resource or image into both the output and IPF files (step 225) can significantly slow-down in a high speed printing work flow. An additional drawback of copying a large resource or image twice is that the memory required to temporarily store two copies of a large resource can be significant.

Figure 3:
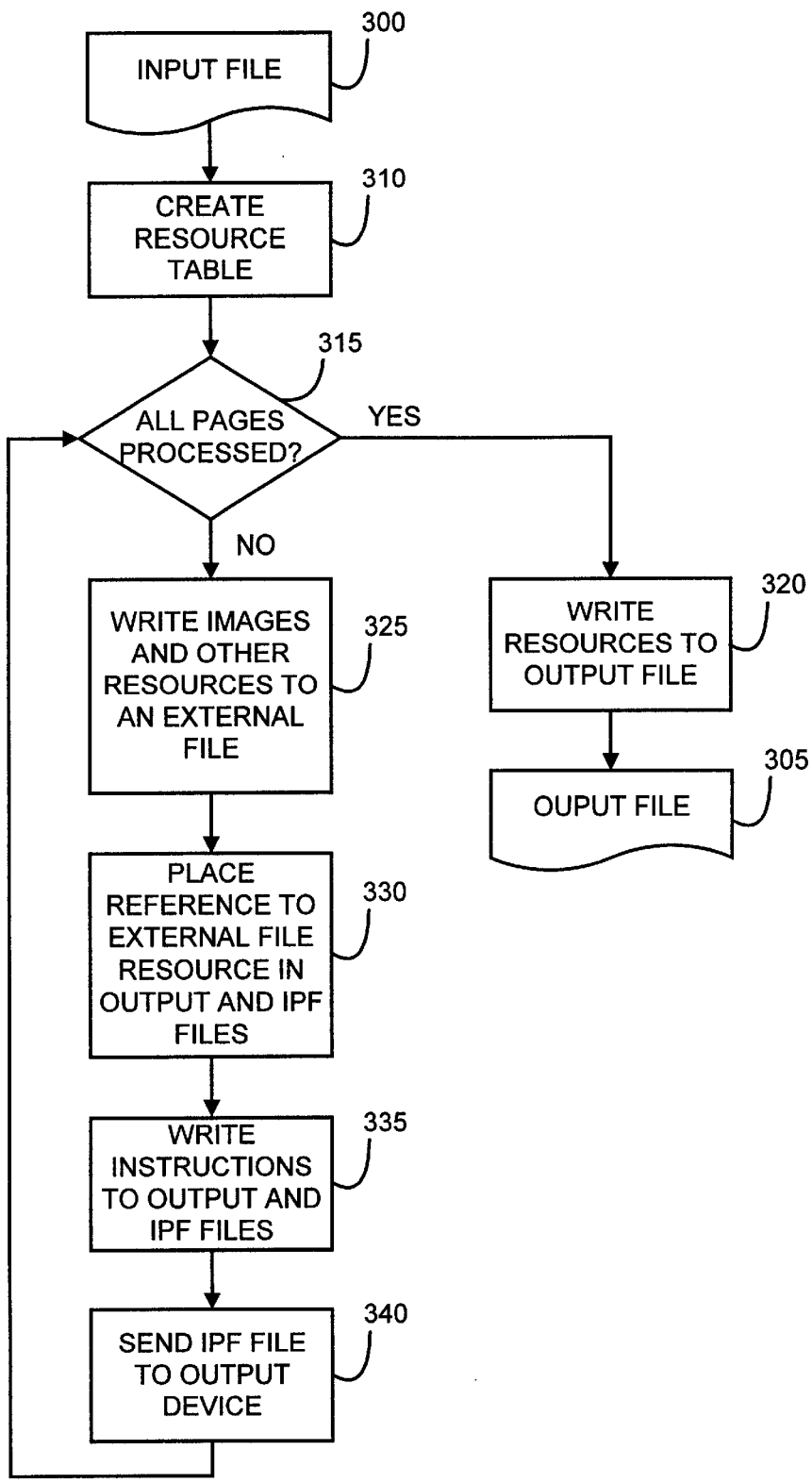
FIG. 3 is a flow-chart of a sidelining normalizer.

FIG. 3 illustrates one technique for converting a page sequential input file 300 to a page independent output file 305 that overcomes these drawbacks. As before, the normalizer creates a resource table (step 310). Next, a check is made to determine if all pages in the input file 300 have been processed (step 315). If all pages in the input file 300 have been processed (the 'yes' prong of step 315), the resources identified in the resource table are written to the output file (step 320) to complete the page independent output file 305. If all pages in the input file 300 have not been processed (the 'no' prong of step 315), the current input file page's images and other resources are streamed to an external file (step 325), one external file for each resource or image. References to the streamed resources and/or images are placed into the output file 305 and the IPF associated with the current input page (step 330). Resources and/or images streamed to a file in step 325 may also be noted in the resource table so that if a subsequent page requires the resource/image its reference may be placed into the output file 305 and IPF at the appropriate location. The operation of streaming an image or resource to an external file is referred to as "sidelining." Next, page description instructions are written to both the output file and the currently active IPF file (step 335) and, when the input file's page has been processed, the current IPF file may be sent immediately to an output device (step 340). Steps 325 through 340 are repeated for each page in the POSTSCRIPT input file 300.

As described in FIG. 3, images and other resources are streamed to external files during the conversion process. Only references to the external files are inserted into the page independent output file 305 and IPFs. In this way only a single copy of a resource or image is actually manipulated by the normalizer or stored in the normalizer's working memory.

Figure 4:
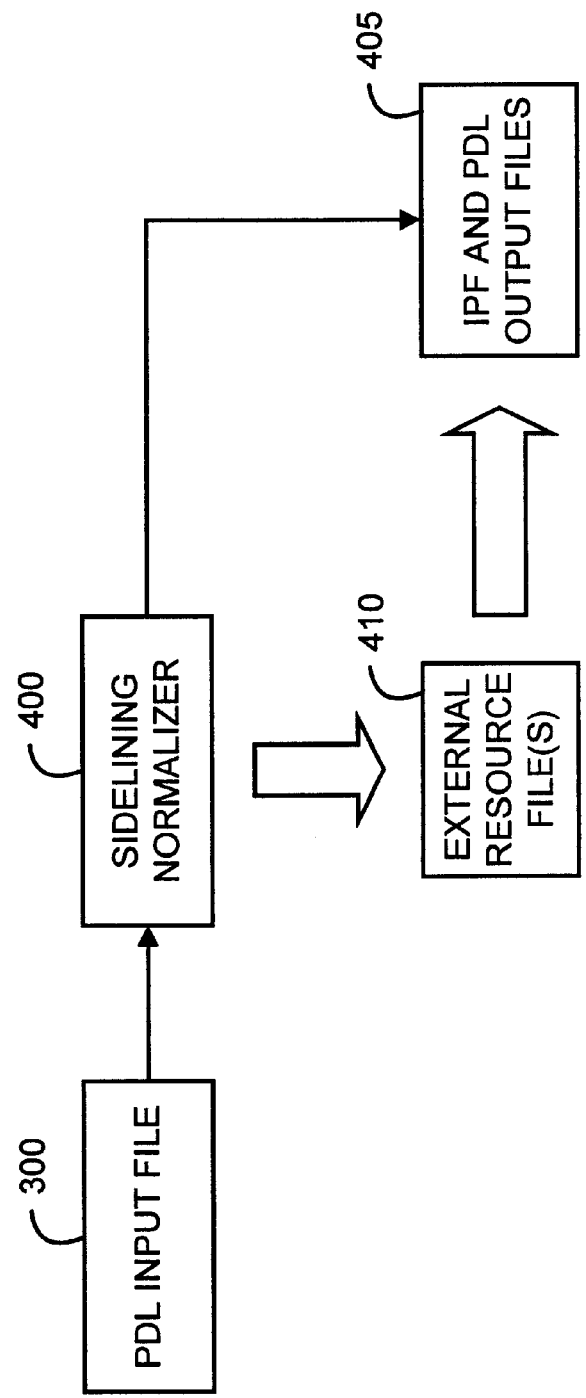
FIG. 4 is an illustrative block diagram of a print system using a sidelining normalizer.

FIG. 4 is an illustrative block diagram of a print system using a sidelining normalizer 400 to convert a page sequential PDL input file 300 to one or more page independent PDL output files 405. The sidelining normalizer 400 creates external resource files 410 that are used by the IPF and output files 405.

In the PDF language, resources are generally described in terms of streams (see, e.g., section 4.8 of the Portable Document Format Reference Manual, version 1.2, available from Adobe Systems Incorporated). In Backus-Naur form notation, PDF stream data structures have the following syntax:

<stream>::=<dictionary>
    stream
    {data}
    endstream

A resource's data is found between the keywords 'stream' and 'endstream'-{data}. Rather than use streams within a PDF file, external files may be used. When this technique is used, the token 'dictionary' identifies the external file in which the resource has been stored and the 'data' element is ignored (in the PDF file). Any data object in an input file that can be described in terms of stream data can be sidelined.

In the POSTSCRIPT level 2 language (see the POSTSCRIPT Language reference Manual, second edition, available from Addison-Wesley Publishing Company), an image may not be used on more than one page, unless it is duplicated in each page that uses it. Thus, if the input file 300 includes an image it may be streamed to an external file (sidelined) and no entry for the image need be made in the normalizer's resource table.

In a different PDL, however, to process images like any other resource each image in the input file 300 can have an entry in the normalizer's resource table identifying the image and the external file in which it is stored. Each page referencing the image (in both the output file 305 and any IPF) would have a reference to the sidelined image's external file inserted into it.

In another embodiment of the invention, only those images and resources larger than a specified size (e.g., 4 KBytes) are sidelined. This can improve the efficiency of sidelining by avoiding the creation of a possibly large number of small external files.

The invention may be implemented in digital electronic circuitry or in computer hardware, firmware, software, or in combinations of them. For example, the invention may be implemented, at least in part, as a computer program tangibly embodied in a machine-readable storage device for execution by a computer processor. Method steps according to the invention may be performed by a computer processor executing instructions organized, e.g., into program modules to operate on input data and to generate output. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs).

The present invention has been described in terms of specific embodiments which are illustrative of the invention only, and are not to be construed a limiting. For example, the invention may be used in fields other than high-speed printing. Other embodiments than those described above are within the scope of the following claims.

What is claimed is:

1. A method to convert a document from a page sequential format to a page independent format comprising:
    receiving a page sequential document having a plurality of pages wherein any page includes a page instruction and a page resource;
    storing a first page instruction in a first output file, the first output file having a page independent format;
    storing a first page resource in a first resource file, the first resource file being external to the first output file;
    creating a reference indicating the first resource file; and
    storing the reference to the first resource file in the first output file, such that any page of the document can be displayed or printed independently of any other page in the document.

2. The method of claim 1 further comprising:
    storing the first instruction in a final output file external to the first output file and the first resource file, the final output file having a page independent format; and
    storing a reference to the first resource file in the final output file.

3. The method of claim 2 wherein a second page in the page sequential document includes a second instruction and a second resource, the method further comprising:
    storing the second instruction in a second output file, the second output file having a page independent format;
    storing the second resource in a second resource file external to the second output file and the first resource file;
    storing a reference to the second resource file in the second output file;
    storing the second instruction in the final output file; and
    storing a reference to the second resource file in the final output file.

4. The method of claim 2 wherein a second page in the page sequential document includes a second instruction and a second resource, the method further comprising:
    storing the first output file on a storage device accessible to an output device;
    storing the first resource file on the storage device accessible to the output device;
    commanding the output device to process the first output file;
    storing the second instruction in a second output file, the second output file having a page independent format;
    storing the second resource in a second resource file external to the second output file and the first resource file;
    storing a reference to the second resource file in the second output file;
    storing the second instruction in the final output file; and
    storing a reference to the second resource file in the final data.

5. The method of claim 4 further comprising storing the first resource file, the second resource file, and the final output file on a second storage device.

6. The method of claim 4 wherein the output device is selected from the group consisting of a high-speed roll-fed press, a printer, an image setter, and a display monitor.

7. The method of claim 1 wherein the page sequential format is the POSTSCRIPT format.

8. The method of claim 1 wherein the page independent format is the PORTABLE DOCUMENT FORMAT.

9. The method of claim 1 wherein the first resource is a font specification.

10. The method of claim 1 wherein the first resource is an image.

11. The method of claim 1 wherein the first resource can be any object defined by stream data.

12. The method of claim 1 wherein the page sequential format is the POSTSCRIPT format, the page independent format is the PORTABLE DOCUMENT FORMAT, and the first resource is an image.

13. The method of claim 1 wherein the page sequential format is the POSTSCRIPT format, the page independent format is the PORTABLE DOCUMENT FORMAT, and the first resource is a font specification.

14. The method of claim 4 wherein the page sequential format is the POSTSCRIPT format, the page independent format is the PORTABLE DOCUMENT FORMAT, the first output file is a first individual page file, the second output file is a second individual page file, the final output file substantially represents the received document, the first output device is a first printer, and the second output device is a second printer.

15. The method of claim 14 wherein the first resource is a font specification.

16. The method of claim 14 wherein the first resource is an image.

17. The method of claim 14 wherein the first resource and the second resource are different.

18. The method of claim 14 wherein the first output device and the second output device are different.

19. A program storage device readable by a computer system, the program storage device having encoded therein a program of instructions that includes instructions to:
receive a page sequential document having a plurality of pages wherein any page includes a page instruction and a page resource;
store a first page instruction in a first output file, the first output file having a page independent format;
store the first page resource in a first resource file, the first resource file being external to the first output file;
create a reference indicating the first resource file; and
store the reference to the first resource file in the first output file such that the first page of the document can be displayed or printed independently of any other page in the document.

20. The program storage device of claim 19 further including instructions to:
store the first instruction in a final output file external to the first output file and the first resource file, the final output file having a page independent format; and
store a reference to the first resource file in the final output file.

21. The program storage device of claim 20 further including instructions to
store a second instruction, on a second page of the page sequential format document, in a second output file, the second output file having a page independent format;
store a second resource, on the second page of the page sequential format document, in a second resource file external to the second output file and the first resource file;
store a reference to the second resource file in the second output file;
store the second instruction in the final output file; and
store a reference to the second resource file in the final output file.

22. The program storage device of claim 20 further including instructions to:
store the first output file on a storage device accessible to an output device;
store the first resource file on the storage device accessible to the output device;
command the output device to process the first output file;
store a second instruction, on a second page of the page sequential format document, in a second output file, the second output file having a page independent format;
store a second resource, on the second page of the page sequential format document, in a second resource file external to the second output file and the first resource file;
store a reference to the second resource file in the second output file;
store the second instruction in the final output file; and
store a reference to the second resource file in the final output file.

23. The program storage device of claim 22 wherein the output device is selected from the group consisting of a high-speed roll-fed press, a printer, an image setter, and a display monitor.

24. The method of claim 19 wherein the page sequential format is the POSTSCRIPT format.

25. The program storage device of claim 19 wherein the page independent format is the PORTABLE DOCUMENT FORMAT.

26. The program storage device of claim 19 wherein the first resource is a font specification.

27. The program storage device of claim 19 wherein the first resource is an image.

28. The program storage device of claim 21 wherein the first resource and the second resource are different.

29. The program storage device of claim 21 wherein the first resource and the second resource can be any object defined in the page independent format by stream data.

* * * * *

UNITED STATES PATENT AND TRADEMARK OFFICE
CERTIFICATE OF CORRECTION

PATENT NO. : 6,262,806 B1  
DATED : July 17, 2001  
INVENTOR(S) : Macduff R. Hughes Page 1 of 1

It is certified that error appears in the above-identified patent and that said Letters Patent is hereby corrected as shown below:

<u>Column 4,</u>  
Line 65, please replace "data" with -- output file --.

Signed and Sealed this

Twelfth Day of March, 2002

Attest:

Attesting Officer

JAMES E. ROGAN  
*Director of the United States Patent and Trademark Office*